W. Money.
Umbrella.
No. 70,241.　　　　　　　　　　　Patented. Oct. 29, 1867.
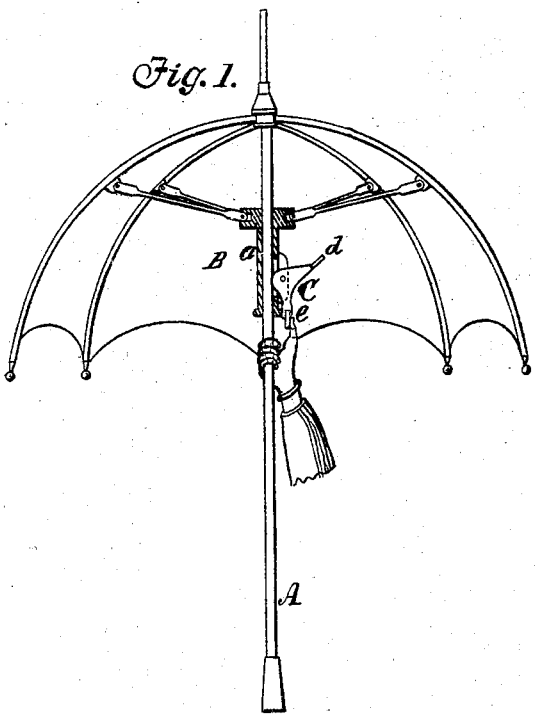
Fig. 1.
Fig. 2.
Witnesses.　　　　　　　　　Inventor:

United States Patent Office.

WILLIAM MONEY, OF PATERSON, NEW JERSEY, ASSIGNOR TO HIMSELF AND EDGAR McCLOUD, OF THE SAME PLACE.

Letters Patent No. 70,241, dated October 29, 1867.

IMPROVEMENT IN FASTENINGS FOR UMBRELLA-RUNNERS.

The Schedule referred to in these Letters Patent and making part of the same.

TO ALL WHOM IT MAY CONCERN:

Be it known that I, WILLIAM MONEY, of Paterson, in the county of Passaic, and State of New Jersey, have invented a new and useful Improvement in Umbrellas; and I do hereby declare that the following is a full, clear, and exact description thereof, which will enable others skilled in the art to make and use the same, reference being had to the accompanying drawings, forming part of this specification.

Figure 1 represents my improved catch in position for holding an umbrella when raised or when let down on the handle.

Figure 2 represents the same when in position to allow the slide to move on the handle for the purpose of raising or lowering the umbrella.

Similar letters of reference indicate corresponding parts.

This invention relates to a new and improved device for holding umbrellas or parasols in place on the handle, whether raised or lowered, and allowing them also to be raised and lowered easily.

The advantages of this improvement consist in the simplicity and effectiveness of the operation of raising or lowering an umbrella, and securing it firmly in place on the staff or handle when it is raised or lowered. The strength of the handle is also preserved, as it is not cut away, as required by the ordinary spring-catch; and my improved catch requires less labor to attach it to an umbrella.

A represents the handle of an umbrella, B, and $a$ is a slide for supporting the ribs, and raising and lowering the umbrella on the handle in the usual way. An eccentric double-lever cam, C, is pivoted on the slide $a$, with its point or heel projecting through a longitudinal slot in the slide, and so formed and hung on the pivot that when the lever $d$ on one side is pressed down with the thumb the cam shall impinge upon the handle, and by its pressure thereon shall firmly hold the slide $a$ in place, so that it cannot slip on the handle, and thus keep the umbrella open when it is raised, or keep it closed when lowered; but when the lever $e$ on the other side of the cam is pressed down, the cam is released and relieved from pressure on the handle, so that the slide can move up and down thereon freely.

Having thus described my invention, what I claim as new, and desire to secure by Letters Patent, is—

The double-lever eccentric cam C, in combination with the umbrella-slide $a$, constructed and operating substantially as and for the purpose herein described.

The above specification of my invention signed by me, this eighth day of August, 1867.

WM. MONEY.

Witnesses:
  E. McCLOUD,
  S. C. JONES.